INVENTOR.
DALLAS W. McMURTRIE
BY Benedict & Swartwood
ATTORNEYS

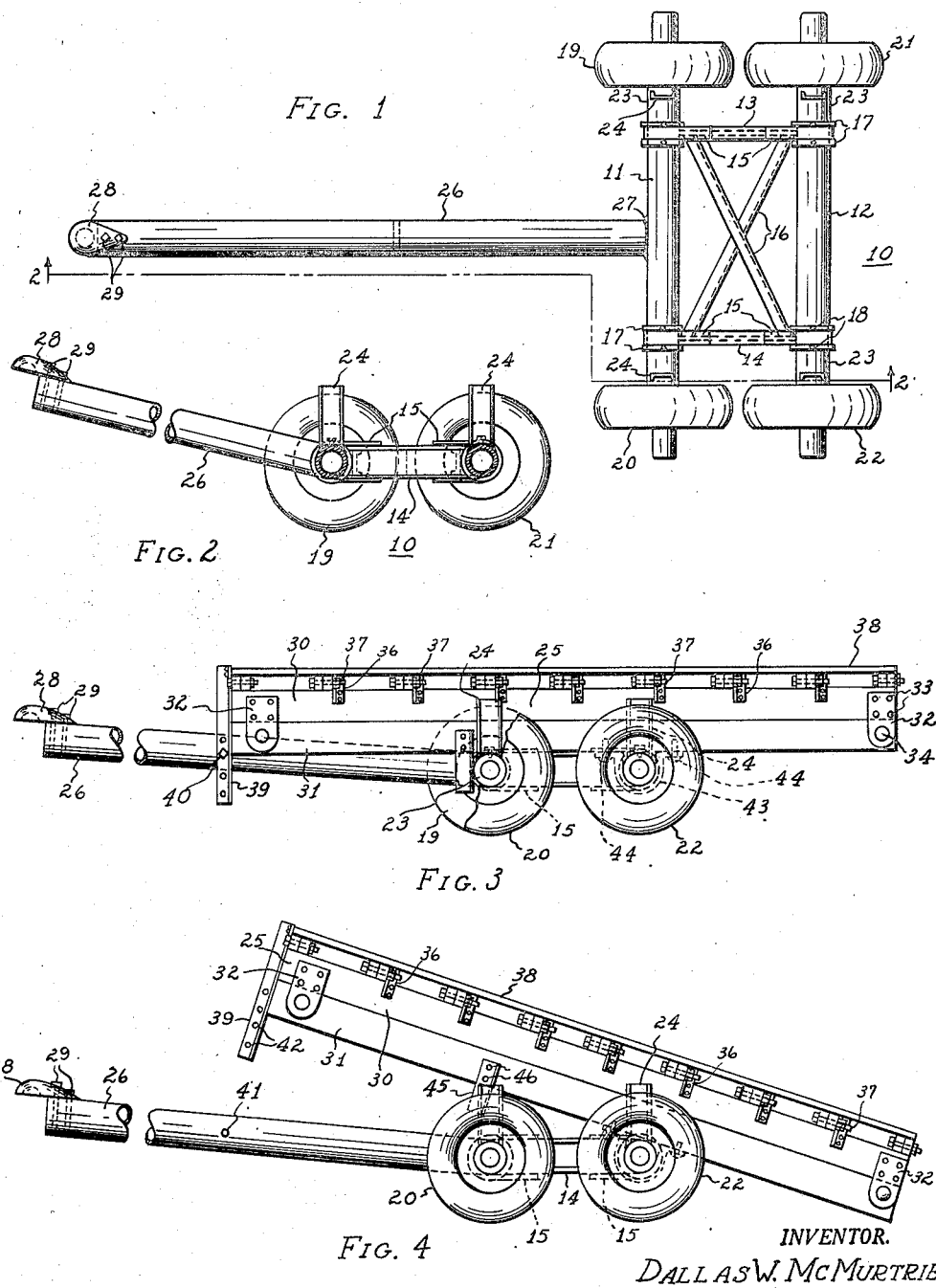
April 25, 1950     D. W. McMURTRIE     2,505,421
TRAILER
Filed June 9, 1947     2 Sheets-Sheet 1
INVENTOR.
DALLAS W. McMURTRIE
BY Benedict & Swartwood
ATTORNEYS April 25, 1950 D. W. McMURTRIE 2,505,421
TRAILER
Filed June 9, 1947 2 Sheets-Sheet 2

Patented Apr. 25, 1950

2,505,421

UNITED STATES PATENT OFFICE 2,505,421

TRAILER

Dallas W. McMurtrie, Veedersburg, Ind.

Application June 9, 1947, Serial No. 753,442

1 Claim. (Cl. 298—17)

This invention relates to an improved trailer to be hauled by a tractor, car and the like.

It relates particularly to the combination of a trailer-bed and wagon used for hauling farm machinery and implements.

It is also designed to be used as a dump type grain-bed used for hauling grain and the like.

It is an object of this invention to provide an improved four-wheel trailer which has the stability of the conventional four-wheel trailer and still has the maneuverability of a two-wheel trailer.

It is also an object of this invention to provide an improved type of dump wagon for use with an improved trailer truck.

Figure 5:
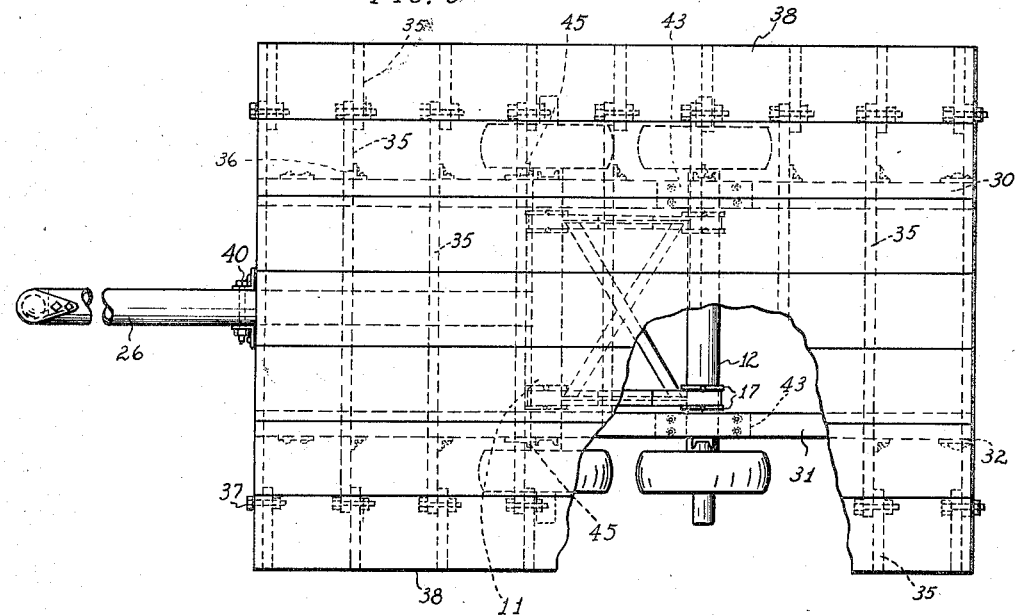
Figure 6:
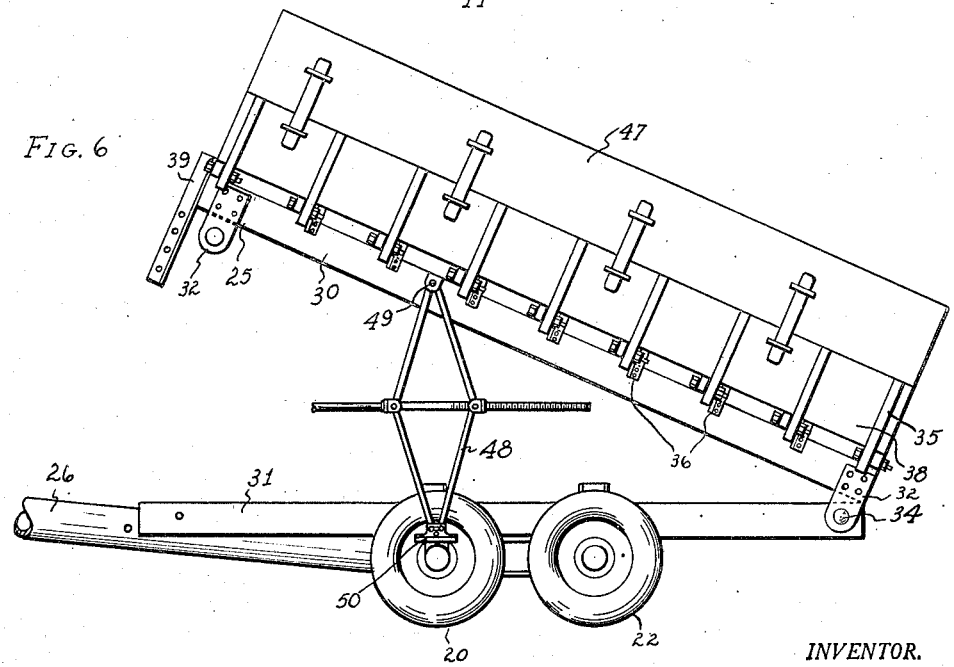

Other objects and the advantages of my invention will become more apparent by describing them in connection with the attached drawings in which Figure 1 is a top view of the trailer running gear. Figure 2 is a side and partially cross-sectional view of the running gear taken along the line 2—2 of Figure 1. Figure 3 is a side view of the trailer and wagon bed in which the wagon bed is in the position of a "flat top". Figure 4 is similar to Figure 3 showing the pivoting action of the wagon bed. Figure 5 is a top view of Figure 3. Figure 6 is a modification showing another means for pivoting and tilting the wagon bed.

Referring to the drawings the trailer running gear is generally referred to by the numeral 10. The frame comprises a pair of hollow tubes or pipes 11 and 12, I beams 13 and 14 to which are fastened by welding the U-shaped strap irons 15. The U-shaped strap irons pass around the tubular members 11 and 12 and thereby hold the frame together. Reinforcing angle irons suitably welded to the I-beams 13 and 14 are provided and are indicated by the numeral 16. Stop rings 17 having set screws 18 are provided to prevent the frame from moving on the tubular or axle members 11 and 12. Suitable wheels having rubber tires are provided and are numbered 19, 20, 21 and 22. The wheels 19, 20, 21 and 22 are journalled in spindles 23 which are attached to the axle or tubular members 11 and 12. Standards 24 made of channel iron are welded to the tubular members 11 and 12 and provide a means for retaining the wagon bed 25 in position.

A tongue 26 is provided and may be made of any suitable material such as wood or iron as long as it is strong enough to absorb stresses and strains that may be placed upon it. In the drawings it is made of metal and is welded to the tubular member 11 at point 27. A ball and socket type hitch 28 is provided and is of the usual conventional design. The hitch 28 is attached to the tongue by means of the bolts 29.

The wagon bed 25 is supported by a pair of superimposed wagon bed sills 30 and 31. As shown in the drawings, a similar pair are provided on the other side of the wagon and which is particularly shown in Figure 5. Hinge brackets 32 fastened by bolts 33 (see Fig. 3) and hinged by pin or bolt 34 are provided for connecting the two sills 30 and 31. Sectional cross beams 35 are provided and which over-lap to provide the support for the flooring of the wagon. The cross beams 35 are fastened to the top bed sill 30 by means of suitable angle iron brackets 36. The bolts 37 passing through the sections of the beams 35 provide a pivoting means for the wagon sides 38; the wagon sides 38 being in the flat or down position in Figures 3 and 4. The over-lapping sectional cross beams 35 prevent the wagon sides 38 from dropping any farther than the desired position. The wagon sides 38 are raised to the position shown in Figure 6 when it is desired to change the wagon from a "flat top" to a conventional wagon box. An angle iron tongue support 39 is provided for bolting the wagon bed assembly to the tongue by passing the bolt 40 through the opening 41 in the tongue. A plurality of holes 42 are provided for adjusting the height of the tongue to fit any type of machine which is hauling the trailer in order that the hitch 28 will be in the proper position. The pair of U-shaped brackets 43 are provided for holding the lower sill 31 to the frame. The brackets 43 pass around the axle or tubular member 12 and attach to the lower sill 31 by means of the bolts 44. The U-shaped brackets 43 therefore provide a means for tilting the wagon bed on the frame upon removal of the bolt 40. A pair of standards 45 are attached to the lower sills 31 on each side of the wagon by means of the bolts 46. The standards 45 rest directly against the tubular member 11 when the wagon bed is in the down position. The standards 45 attached to the bottom bed sill directly in front of the axle transfers the pulling force exerted on the front axle by the tongue to the bed sills and therefore less strain is placed on the running gear surface.

Referring particularly to Figures 4 to 6, the sides of the wagon are pivoted towards the up position. Additional sides 47 are provided and attached to the wagon sides 38 in the usual manner. Figure 6 shows another manner of tilting the wagon bed. The front bracket 32 of Figures 3 and 4 is removed permitting the sill 30 to pivot about the pin 34. In Figure 6 the lower sill 31 is fastened to the axle 11 by brackets similar to the brackets 43 which fastens the lower sill 31 to the rear axle 12. In Figure 6 a bracket 48 is provided which is attached to the bed at the point 49 and to the axle by the iron bracket support 50. The apparatus of Figure 6 is especially suitable for dumping grain whereas the tilting mechanism shown in Figures 3 and 4 is particularly adaptable for the loading of machinery upon a flat top wagon. Both of them have a large number of uses around a farm.

It should be noted that in Figures 3 and 4 that the wagon bed is equally balanced upon the two axles 11 and 12. The axles 11 and 12 are spaced just far enough apart that the pairs of wheels 20 and 22 and 19 and 21 are as close together as possible without causing any interference. The use of four wheels therefore prevents undue tilting or rocking of the wagon bed during hauling. Such tilting does occur in the use of two wheeled trailers. However, the maneuverability is substantially maintained since the wheels are together and in alignment and the wheels are journalled to the axles 11 and 12.

The wagon bed is constructed so that it will just clear the wheels therefore making the bed floor as low as possible. The sides of the wagon bed when opened for a flat top is about 8 x 12 feet. It should also be noted that the running gear is made of very few parts which makes it simple in construction and there are few working parts to get out of order. The preferred way of tilting the wagon bed which is shown in Figures 3 and 4 provides a means for relieving the strain on the running gear when loading equipment since the back end of the wagon bed rests on the ground.

Various other embodiments of my invention may be made within the scope of the following claim.

I claim as my invention:

A trailer comprising front and rear axles, wheels rotatably mounted on each end of each axle, a rigid frame including longitudinally extending side beams secured to said axles and maintaining said axles in parallel relationship with the peripheries of the wheels on the front and rear axles in closely spaced relationship, longitudinally extending sills resting directly on said axles, means securing each sill to one of said axles, a bed supported by said sills, a tongue extending forwardly from said front axle, and adjustable means for securing an intermediate portion of said tongue to the forward end of said bed in any of a plurality of vertical positions to provide adjustment of the height of the forward end of said tongue while said bed remains horizontal with both pairs of wheels on the ground.

DALLAS W. McMURTRIE.

REFERENCES CITED

The following references are of record in the file of this patent:

UNITED STATES PATENTS

| Number | Name | Date |
| --- | --- | --- |
| 748,246 | Williams | Dec. 29, 1903 |
| 1,840,435 | Davis | Jan. 12, 1932 |
| 2,225,522 | Keith | Dec. 17, 1940 |

FOREIGN PATENTS

| Number | Country | Date |
| --- | --- | --- |
| 324,122 | Italy | Jan. 21, 1935 |
| 461,297 | Great Britain | Feb. 15, 1937 |